United States Patent [19]
Furukawa et al.

[11] Patent Number: 4,956,248
[45] Date of Patent: Sep. 11, 1990

[54] NON-AQUEOUS SECONDARY CELL

[75] Inventors: Nobuhiro Furukawa, Hirakata; Toshiyuki Nohma, Kadoma; Yuji Yamamoto, Osaka, all of Japan

[73] Assignee: Sanyo Electric Co., Ltd., Moriguchi, Japan

[21] Appl. No.: 394,442

[22] Filed: Aug. 16, 1989

[30] Foreign Application Priority Data

Aug. 25, 1988 [JP] Japan ................................. 63-211933
Aug. 30, 1988 [JP] Japan ................................. 63-215870

[51] Int. Cl.⁵ ..................... H01M 10/40; H01M 4/50
[52] U.S. Cl. ................................. 429/194; 429/224; 252/182.1
[58] Field of Search ..................... 429/224, 194, 197; 252/182.1

[56] References Cited

U.S. PATENT DOCUMENTS

| 4,507,371 | 3/1985 | Thackeray et al. | 429/224 |
| 4,758,484 | 7/1988 | Furukawa et al. | 429/194 |
| 4,820,599 | 4/1989 | Furukawa et al. | 429/194 |
| 4,828,834 | 5/1989 | Nagaura et al. | 429/224 |

FOREIGN PATENT DOCUMENTS 56-57260 5/1981 Japan .
63-114064 5/1988 Japan .

Primary Examiner—Donald L. Walton
Attorney, Agent, or Firm—Armstrong, Nikaido, Marmelstein, Kubovcik & Murray

[57] ABSTRACT

A non-aqueous secondary cell having a compound of manganese oxide, lithium salt and metal oxide as an active material of a positive electrode is disclosed. A negative electrode comprises lithium or lithium alloy. The above positive electrode improves the charge/discharge cycle characteristic and charge/discharge reversibility of the cell and can be produced at a low cost.

5 Claims, 5 Drawing Sheets

NON-AQUEOUS SECONDARY CELL

BACKGROUND OF THE INVENTION

(1) Field of the Invention

This invention relates to a non-aqueous secondary cell having lithium or lithium alloy as an active material of a negative electrode, especially to an improved positive electrode.

(2) Description of the Related Art

As an active material of a positive electrode of a non-aqueous secondary cell, molybdenum trioxide, vanadium pentoxide, sulfide of titanium or niobium, activated carbon, and the like have been proposed, and some of them have been put into practical use.

As an active material of a positive electrode of a non-aqueous primary cell, manganese dioxide ($MnO_2$) and carbon fluoride are well known and have already been practically used. Especially, $MnO_2$ has advantages of excellent storage characteristics, availability in abundance and low cost.

$MnO_2$ is considered to be suitable for an active material of a positive electrode of a non-aqueous secondary cell because of the above reasons. However, it is poor in reversibility, which results in a poor charge/discharge cycle characteristic.

In order to solve the above problem of $MnO_2$, the applicant proposed using $MnO_2$ including $Li_2MnO_3$ as an active material of a positive electrode (U.S. Pat. No. 4,758,484). This improved the charge/discharge cycle characteristic to some extent, but more improvement has been demanded for practical use.

As for an active material of a positive electrode of a non-aqueous primary cell, Japanese Patent Kokai No. 56-57260 discloses the use of a compound obtained by heat-treating a mixture of $MnO_2$ and $MoO_3$ (molybdenum trioxide). It is known that this compound improves the discharge characteristic in the high rate range because of its distorted crystal structure. However, when the compound is used for a secondary cell, the distortion is not big enough to improve the charge/discharge reversibility of the cell.

SUMMARY OF THE INVENTION

Accordingly, this invention has a primary object of providing a non-aqueous secondary cell with improved charge/discharge cycle characteristic by using a compound which is mainly formed of manganese oxide, is inexpensive, and is excellent in charge/discharge reversibility as an active material of a positive electrode.

The above object is fulfilled by a non-aqueous secondary cell comprising a positive electrode, a negative electrode and a separator; characterized in that an active material of the negative electrode is one of lithium and lithium alloy and that an active material of the positive electrode is a compound obtained by heat-treating a mixture of manganese oxide, lithium salt and metal oxide.

A metal composing the metal oxide may be selected from the group consisting of Mo, Nb, W, Ru, Co, Ti, Bi, Cu and Cr.

$MnO_2$ as manganese oxide and $MoO_3$ as metal oxide (MOx) were mixed in a Mn-Mo atomic ratio of 9:1, and the obtained mixture was heat-treated at 375° C. The X-ray diffraction pattern of the obtained substance is shown in FIG. 1. Peaks of both $\gamma$-$\beta$-$MnO_2$ and $MoO_3$ are seen. The peaks of $\gamma$-$\beta$-$MnO_2$ in FIG. 1 are broader than in the X-ray diffraction pattern of only $\gamma$-$\beta$-$MnO_2$, but no drastic shift of diffraction angles can be seen.

$MnO_2$, $MoO_3$ and LiOH as lithium salt were mixed in a Mn-Mo-Li atomic ratio of 9:1:3, and the obtained mixture was heat-treated at 375° C. The X-ray diffraction pattern of the obtained substance is shown in FIG. 2. Compared with the pattern of FIG. 1, the peak of $MoO_3$ is lost, the diffraction angles of $\gamma$-$\beta$-$MnO_2$ are shifted, and there occurs another peak. This new peak is considered to be the one of a composite oxide of Mn, Mo and Li.

As shown above, when a compound of $MnO_2$ and a composite oxide of Mn, Mo and Li is used as an active material of a positive electrode of a secondary cell, the cell has an excellent charge/discharge cycle characteristic. The reason is assumed to be the synergetic effect of the following two: (1) because the crystal structure of the composite oxide is greatly distorted, lithium ions easily transfer in the solid phase; and (2) the lithium which has already been included in the solid phase eases the diffusion of the lithium ions which have invaded into the solid phase by discharging.

The above advantage can also be seen when oxide of Nb, W, Ru, Co, Ti, Bi, Cu or Cr is used instead of Mo oxide.

As for the heat-treating temperature when $MnO_2$ is used, if even the bound water is to be removed during heat-treating, the range from the level at which moisture removing effect can be seen to the level at which $MnO_2$ is decomposed, practically 300°–480° C., is desirable. Especially, 350°–450° C. is best.

The charge/discharge cycle characteristic of the cell can be improved by a non-aqueous secondary cell comprising a positive electrode and a negative electrode; characterized in that an active material of the positive electrode is spinel $LiMn_2O_4$ including Cr (chromium) and that an active material of the negative electrode is one of lithium and lithium alloy.

Because spinel $LiMn_2O_4$ including Cr has Cr in its tri-dimensional channel structure, its crystallinity is lower than that of $LiMn_2O_4$ without Cr. As a result, the breakage of the crystal structure, which would be caused by the transfer of lithium ions into and out of the crystal structure when the crystallinity is high, is restrained. Therefore, the charge/discharge cycle characteristic of $LiMn_2O_4$ including Cr can be improved.

For producing spinel $LiMn_2O_4$, the mixture of manganese oxide and lithium salt should be heat-treated at a high temperature of 800° to 900° C. If it is heat-treated at 300° to 480° C., the obtained substance is a simple mixture of $Li_2MnO_3$ and $MnO_2$. On the other hand, if chromium oxide is added to the mixture of manganese oxide and lithium salt and heat-treated, 300° to 480° C. is high enough to obtain spinel $LiMn_2O_4$ including Cr, probably because Cr acts as a catalyst in the production of spinel $LiMn_2O_4$. Such low heat-treating temperature has the advantage that it eases the production control.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DETAILED DESCRIPTION OF PREFERRED EMBODIMENTS

Embodiment 1

50 g of chemical $MnO_2$ having an average particle diameter not exceeding 30 $\mu$m, 9 g of $MoO_3$, and 5 g of LiOH were mixed in a mortar and heat-treated at 375° C. for 20 hours in the air, thereby to obtain a compound to be used as an active material of a positive electrode.

Powders of the above active material, acetylene black as a conductive agent and fluororesin powders as a binder were mixed in a weight ratio of 90:6:4. The obtained mixture was molded under a pressure of 2 tons/cm$^2$ to have a diameter of 20 mm and was heat-treated at 250° C. to get a positive electrode.

A negative electrode was obtained by punching a circle having a diameter of 20 mm out of a lithium foil having a specified thickness.

Figure 1:
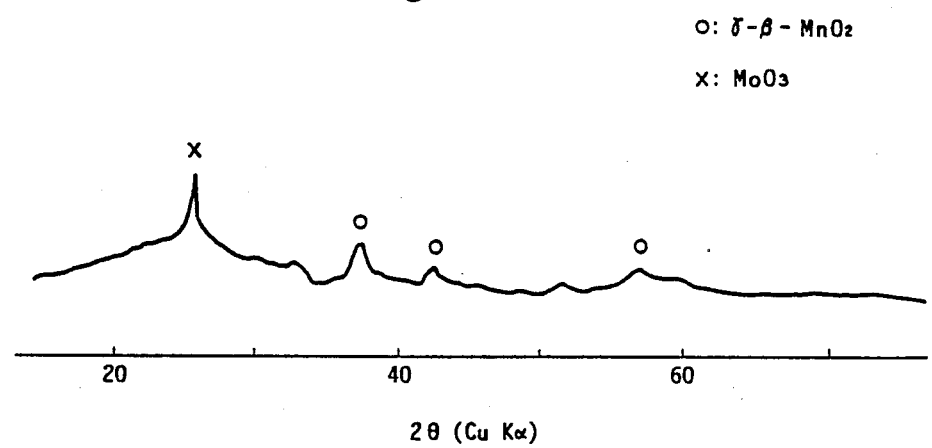
FIG. 1 is a graph showing an X-ray diffraction pattern of the compound obtained by heat-treating the mixture of $MnO_2$ and $MoO_3$.
Figure 2:
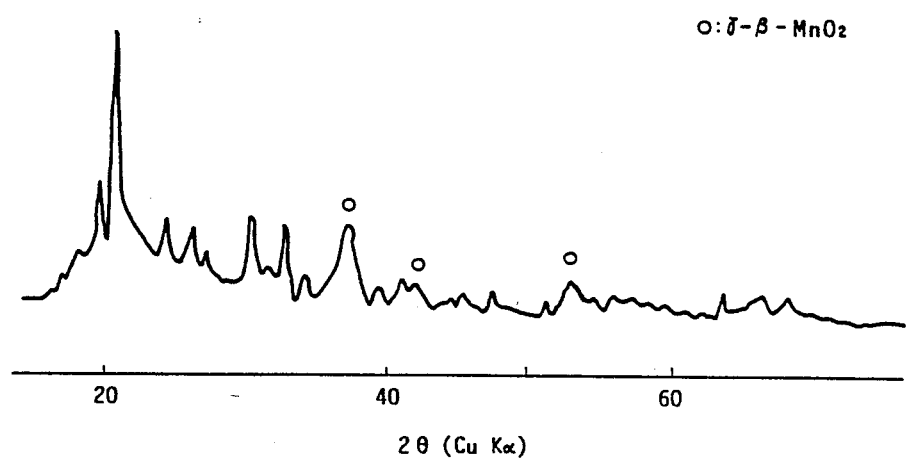
FIG. 2 is a graph showing an X-ray diffraction pattern of the compound obtained by heat-treating the mixture of $MnO_2$, $MoO_3$ and LiOH.
Figure 3:
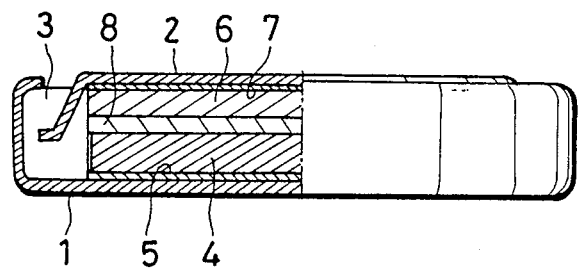
FIG. 3 is a half cross section of a cell according to the present invention.

FIG. 3 is a half cross section of a flat-type non-aqueous secondary cell which comprises the above positive and negative electrodes. A stainless steel positive electrode can 1 and a stainless steel negative electrode can 2 are separated from each other by a polypropylene insulating packing 3. A positive electrode 4, which constitutes the gist of this invention, is pressure-contacted on a positive electrode collector 5 adhered on the inner bottom surface of the positive electrode can 1. A negative electrode 6 is pressure-contacted on a negative electrode collector 7 adhered on the inner bottom surface of the negative electrode can 2. A separator was formed of a microporous thin membrane of polypropylene. An electrolyte was produced by dissolving 1 mol/l of lithium perchlorate in a solvent mixture of propylene carbonate and dimethoxyethane. Cell $A_1$ produced in this way had a diameter of 24.0 mm and a thickness of 3.0 mm.

Embodiment 2

Cell $A_2$ was produced in the same way as Cell $A_1$ except that 8 g of $NbO_2$ was used instead of 9 g of $MoO_3$.

Embodiment 3

Cell $A_3$ was produced in the same way as Cell $A_1$ except that 15 g of $WO_3$ was used instead of 9 g of $MoO_3$.

Embodiment 4

Cell $A_4$ was produced in the same way as Cell $A_1$ except that 9 g of $RuO_3$ was used instead of 9 g of $MoO_3$.

Embodiment 5

Cell $A_5$ was produced in the same way as Cell $A_1$ except that 7 g of $CoO_3$ was used instead of 9 g of $MoO_3$.

Embodiment 6

Cell $A_6$ was produced in the same way as Cell $A_1$ except that 5 g of $TiO_2$ was used instead of 9 g of $MoO_3$.

Embodiment 7

Cell $A_7$ was produced in the same way as Cell $A_1$ except that 15 g of $Bi_2O_3$ was used instead of 9 g of $MoO_3$.

Embodiment 8

Cell $A_8$ was produced in the same way as Cell $A_1$ except that 5 g of CuO was used instead of 9 g of $MoO_3$.

Embodiment 9

Cell $A_9$ was produced in the same way as Cell $A_1$ except that 6 g of $Cr_2O_5$ was used instead of 9 g of $MoO_3$. A positive electrode of this cell has spinel $LiMn_2O_4$ including Cr as an active material.

Comparative Example 1

Cell $B_1$ was produced in the same way as Cell $A_1$ except that lithium salt was not added.

Comparative Example 2

Cell $B_2$ was produced in the same way as Cell $A_1$ except that only $MnO_2$ and LiOH were mixed and heat-treated without using any other metal oxide.

Experiment 1

Figure 4:
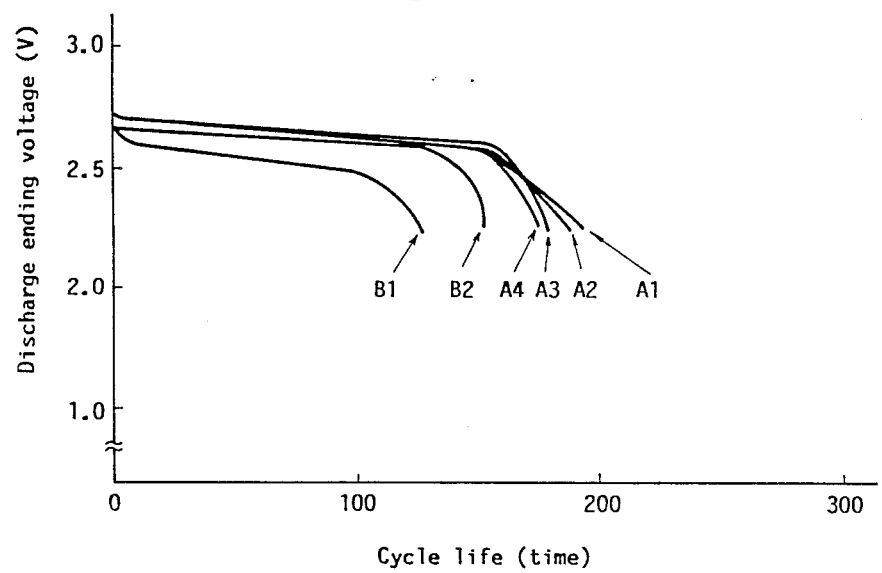
FIGS. 4 and 5 are graphs showing the charge/discharge cycle characteristics of the embodiment of this invention and a comparative example.
Figure 5:
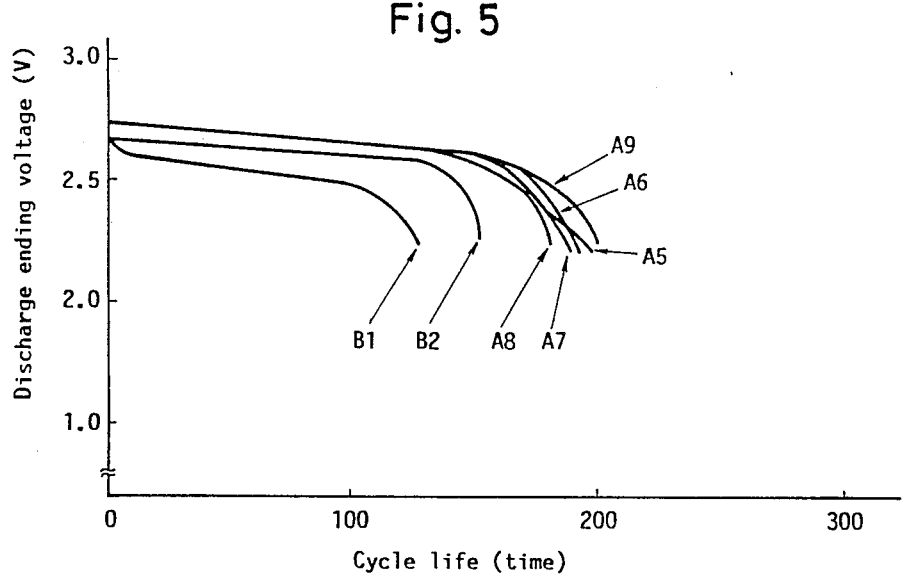

FIGS. 4 and 5 are graphs showing charge/discharge cycle characteristics of all the above cells. They were charged in a current of 3 mA to the charge ending voltage of 4.0 V and discharged in a current of 3 mA for 4 hours. The discharge ending voltages were measured. The cycle characteristics of Cells $A_1$ through $A_9$ are more excellent than those of Cells $B_1$ and $B_2$.

Although LiOH was used as lithium salt in the above cells, lithium nitrate, lithium carbonate, lithium phosphate or the like may also be used.

The above embodiments were produced by using different kinds of metal oxide while fixing the heat-treating temperature and time. The following embodiments were produced by changing the heat-treating temperature and time while using the same metal oxide.

Embodiment 10

$Cr_2O_5$ as metal oxide, LiOH and $MnO_2$ were mixed in a Cr-Li-Mn atomic ratio of 0.2:1:2. The mixture was heat-treated at 375° C. for 20 hours in the air to obtain spinel $LiMn_2O_4$ including Cr (referred to as $M_1$ hereinafter). $Cr_2O_5$ is one of chromium oxides expressed by $CrO_x$ ($x \geq 3$).

$M_1$, acetylene black as a conductor, and fluororesin powders as a binder were mixed in a weight ratio of 90:6:4. The obtained substance was molded under a pressure of 2 tons/cm$^2$ to have a diameter of 20.0 mm, and then vacuum heat-treated at 200° to 300° C. to get a positive electrode.

A negative electrode was obtained by punching a circle having a diameter of 20 mm out of lithium foil having a specified thickness. A separator was formed of a microporous thin membrane of polypropylene. An electrolyte was produced by dissolving 1 mol/l of lithium perchlorate in a solvent mixture comprising the same volume of propylene carbonate and 1,2 dimethoxyethane. Cell $A_{10}$ obtained in this way was also flat-type as Cell $A_1$ shown in FIG. 3. In this embodiment, the atomic ratio of Cr:Li:Mn was 0.2:1:2, but the weight ratio of $Cr_2O_5$:LiOH:$MnO_2$ was the same as in Embodiment 9. Therefore, it can be said that Cells $A_9$ and $A_{10}$ were produced in the same way and have the same active material in their positive electrodes.

Embodiment 11

$Cr_2O_5$, LiOH and $MnO_2$ were mixed in a Cr-Li-Mn atomic ratio of 0.2:1:2. The mixture was heat-treated at 650° C. for 6 hours and then at 850° C. for 14 hours in the air to obtain spinel $LiMn_2O_4$ including Cr (referred to as $M_2$ hereinafter).

Cell $A_{11}$ was produced in the same way as Cell $A_{10}$ except that $M_2$ was used as an active material of a positive electrode instead of $M_1$.

Comparative Example 3

LiOH and $MnO_2$ was mixed in a Li-Mn atomic ratio of 1:2. The obtained substance was heat-treated at 375° C. for 20 hours in the air to produce a compound of $Li_2MnO_3$ and $MnO_2$ (referred to as $M_3$ hereinafter).

Cell $B_3$ was produced in the same way as Cell $A_{10}$ except that $M_3$ was used as an active material of a positive electrode instead of $M_1$.

Comparative Example 4

LiOH and $MnO_2$ was mixed with a Li-Mn atomic ratio of 1:2. The obtained substance was heat-treated at 650° C. for 6 hours and then at 850° C. for 14 hours in the air to produce spinel $LiMn_2O_4$ without Cr (referred to as $M_4$ hereinafter).

Cell $B_4$ was produced in the same way as Cell $A_{10}$ except that $M_4$ was used as an active material of a positive electrode instead of $M_1$.

Experiment 2

Figure 6:
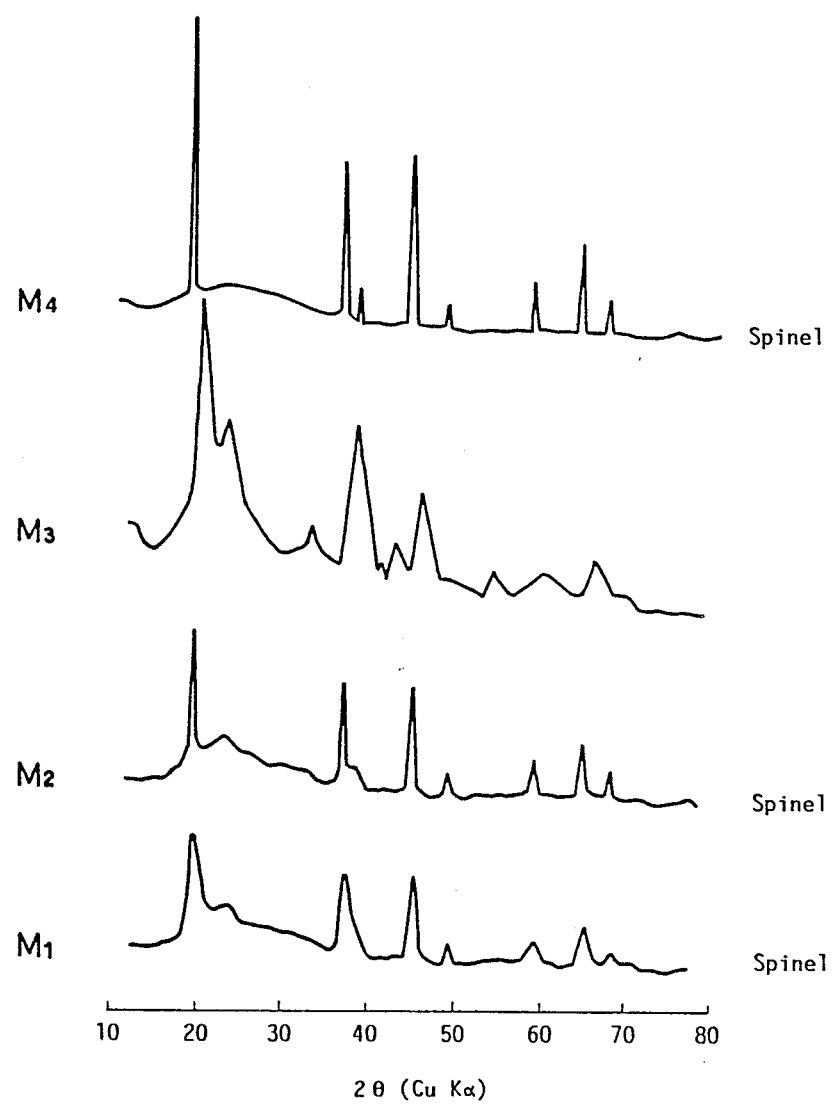
FIG. 6 is a graph showing X-ray diffraction patterns of the positive electrode active materials of cells $A_{10}$ and $A_{11}$ of this invention and $B_3$ and $B_4$ as comparative examples.

FIG. 6 is a graph showing X-ray diffraction patterns of various kinds of manganese oxide ($M_1$ through $M_4$) obtained in Embodiments 10 and 11 and Comparative Examples 3 and 4. Table 1 shows their surface areas per gram.

TABLE 1

|  |  | Surface area |
|---|---|---|
| Embodiments | $M_1$ | 58.0 m$^2$/g |
|  | $M_2$ | 3.0 m$^2$/g |
| Comparative | $M_3$ | 25.0 m$^2$/g |
| Examples | $M_4$ | 2.7 m$^2$/g |

In FIG. 6, $M_2$ and $M_4$ show the diffraction patterns of spinel $LiMn_2O_4$. The diffraction angles of $M_2$ are the same as those of $M_4$, but the peaks of $M_2$ are broader than those of $M_4$. It means $M_2$ has lower crystallinity than $M_4$. $M_1$ also shows the diffraction pattern of spinel $LiMn_2O_4$, but its peaks are still broader than those of $M_2$. It means that $M_1$ has still lower crystallinity than $M_2$. $M_3$ does not show the diffraction pattern of spinel $LiMn_2O_4$ but of $Li_2MnO_3$ and $MnO_2$.

As apparent from Table 1, as the heat-treating temperature becomes lower, the surface area per gram of the obtained manganese oxide becomes larger.

Experiment 3

Figure 7:
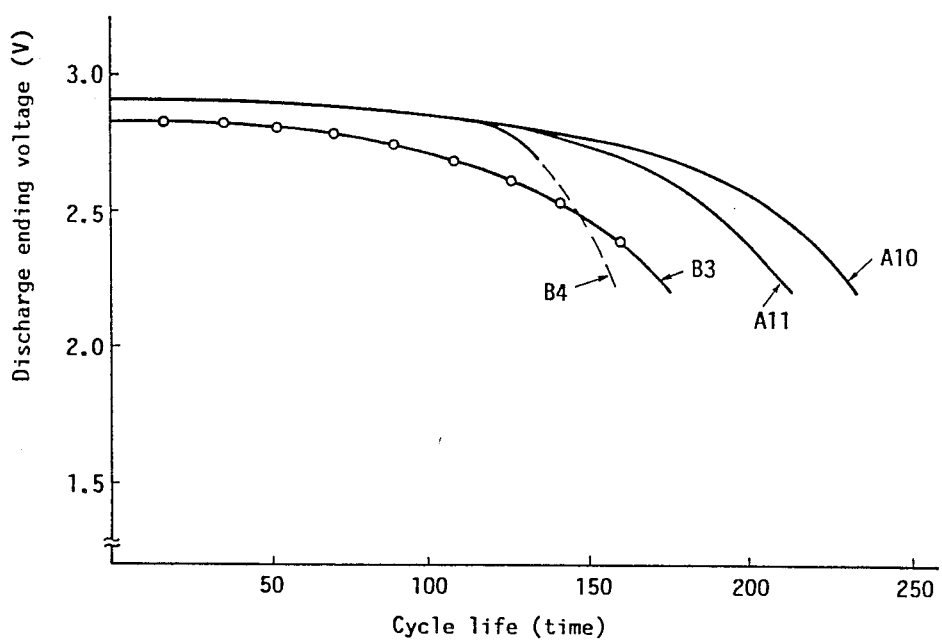
FIG. 7 is a graph showing charge/discharge cycle characteristics of cells $A_{10}$, $A_{11}$, $B_3$ and $B_4$.

FIG. 7 is a graph showing charge/discharge cycle characteristics of Cells $A_{10}$, $A_{11}$, $B_3$ and $B_4$. They were charged in a current of 1 mA to the charge ending voltage of 4.0 V and discharged in a current of 1 mA for 12 hours. The discharge ending voltages were measured.

As apparent from FIG. 7, Cells $A_{10}$ and $A_{11}$ according to this invention, each having spinel $LiMn_2O_4$ including Cr as the active material of the positive electrode, have more excellent charge/discharge cycle characteristics than Cells $B_3$ and $B_4$. Cell $B_3$ has a compound of $Li_2MnO_3$ and $MnO_2$, and Cell $B_4$ has spinel $LiMn_2O_4$ without Cr, as the active material of the positive electrode.

Comparing Cells $A_{10}$ and $A_{11}$, the former has more excellent charge/discharge cycle characteristic than the latter. The reason is considered to be the following:

Since the heat-treating temperature for producing Cell $A_{10}$ is lower than that for producing Cell $A_{11}$, the obtained spinel $LiMn_2O_4$ has larger surface areas per gram in Cell $A_{10}$ than in Cell $A_{11}$. As a result, Cell $A_{10}$ has less polarization than Cell $A_{11}$ at charge/discharge, and therefore, less electrolyte is decomposed by excessive voltage when charged in the case of Cell $A_{10}$ than in the case of Cell $A_{11}$.

Experiment 4

Figure 8:
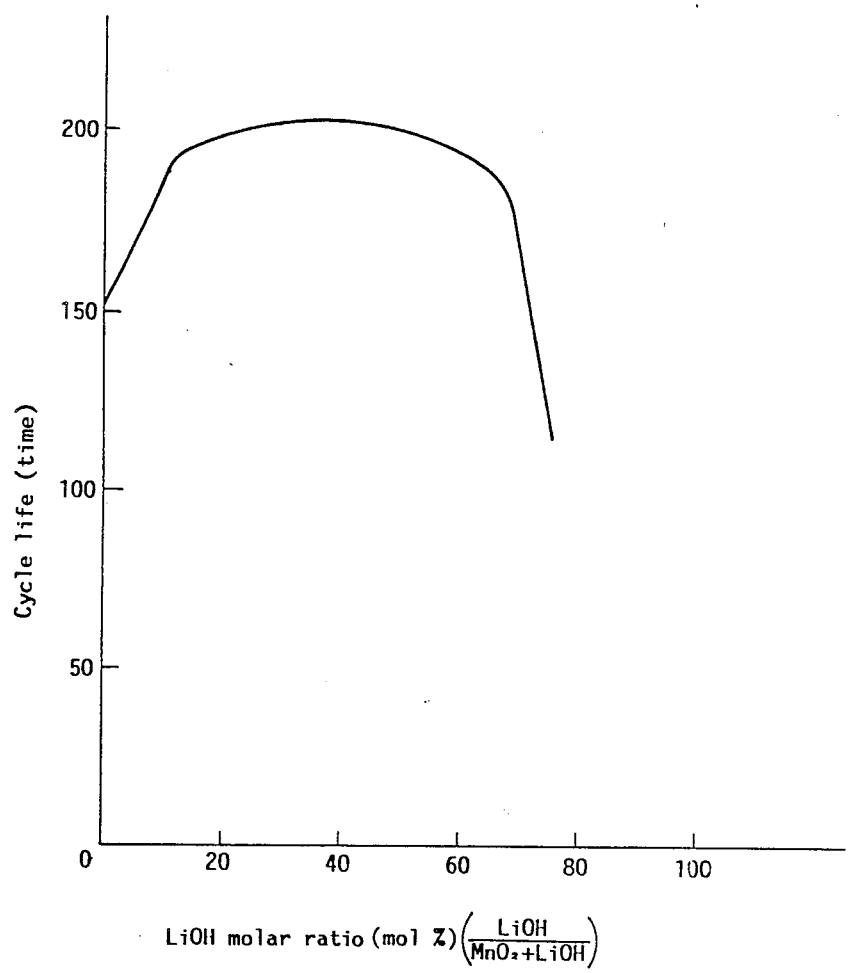
FIG. 8 is a graph showing the relationship between lithium molar ratio and the cycle life.

Next, several cells were produced using the fixed mixture ratio of $MnO_2$ and $MoO_3$ while changing the amount of LiOH, and the cycle life of each cell was measured. The relationship between LiOH molar ratio and the cycle life of each cell is shown in FIG. 8. The Mn-Mo atomic ratio was fixed at 9:1. Each cell was discharged in a current of 3 mA for 4 hours and charged in a current of 3 mA to the charge ending voltage of 4.0 V. Other conditions for producing the cell were the same as in Embodiment 1. As apparent from FIG. 8, 10–67 mol % is best as the mixture ratio of lithium salt.

The amount of the metal oxide (MOx) is not limited to the figures mentioned in the above embodiments, but may be increased or decreased. However, too small an amount of metal oxide eliminates the crystal structure distortion effect. On the other hand, too large an amount of metal oxide decreases the discharging capacity. Usually, the range from several percent to the same amount as $MnO_2$ is desirable.

This invention is not limited to a secondary cell using a non-aqueous liquid electrolyte as shown in the above embodiments, but may be applied to a secondary cell using a solid electrolyte. In other words, this invention can be applied to all kinds of non-aqueous secondary cells. The above-mentioned solid electrolyte is conductive to lithium ion and is either organic or inorganic. Inorganic type includes $Li_3N$, $P_2S_2$-$Li_2S$-LiI, $B_2S_3$-$Li_2S$-LiI, $SiO_2$-$Li_2O$-$LiB_2$, et. al. Organic type includes $LiClO_4$-PEO, $LiCF_3SO_3$-PPO, et al.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A non-aqueous secondary cell comprising a positive electrode, a negative electrode and a separator; characterized in that an active material of the negative electrode is one of lithium and lithium alloy and that an active material of the positive electrode is a compound obtained by heat-treating a mixture of manganese oxide, lithium salt and metal oxide.

2. A non-aqueous secondary cell of claim 1, wherein a metal composing said metal oxide is selected from the group consisting of Mo, Nb, W, Ru, Co, Ti, Bi, Cu and Cr.

3. A non-aqueous secondary cell of claim 1, wherein the active material of the positive electrode is spinel $LiMn_2O_4$ obtained by adding chromium oxide to a mixture of manganese dioxide and lithium salt and heat-treating the mixture added with the chromium oxide.

4. A non-aqueous secondary cell comprising a positive electrode and a negative electrode; characterized in that an active material of the positive electrode is spinel $LiMn_2O_4$ including Cr and that an active material of the negative electrode is one of lithium and lithium alloy.

5. A method of producing an active material of a positive electrode for a non-aqueous secondary cell, comprising steps of adding chromium oxide to a mixture of manganese dioxide and lithium salt and heat-treating the mixture added with the chromium oxide to obtain spinel $LiMn_2O_4$.

* * * * *